(12) United States Patent
Obuchi et al.

(10) Patent No.: US 8,780,792 B2
(45) Date of Patent: Jul. 15, 2014

(54) WIRELESS BASE STATION AND MOBILE STATION

(75) Inventors: Kazuhisa Obuchi, Yokohama (JP);
Tetsuya Yano, Yokosuka (JP); Shunji Miyazaki, Yokosuka (JP)

(73) Assignee: Fujitsu Limited, Kawasaki (JP)

( * ) Notice: Subject to any disclaimer, the term of this patent is extended or adjusted under 35 U.S.C. 154(b) by 546 days.

(21) Appl. No.: 11/156,894

(22) Filed: Jun. 21, 2005

(65) Prior Publication Data

US 2006/0133323 A1 Jun. 22, 2006

(30) Foreign Application Priority Data

Dec. 17, 2004 (JP) ................................. 2004-366514

(51) Int. Cl.
*H04W 4/00* (2009.01)

(52) U.S. Cl.
USPC ........... 370/328; 370/331; 370/332; 370/333; 370/334; 370/335; 370/336; 455/436; 455/437; 455/438; 455/439; 455/440; 455/441

(58) Field of Classification Search
CPC ..... H04W 28/00; H04W 28/22; H04W 36/16; H04W 52/26; H04W 76/06
USPC ............................ 370/310–350; 455/436–444
See application file for complete search history.

(56) References Cited

U.S. PATENT DOCUMENTS

| 5,289,525 | A | * | 2/1994 | Issenmann et al. | 455/436 |
| 5,953,324 | A | * | 9/1999 | Adachi | 370/331 |
| 7,738,423 | B2 | * | 6/2010 | Khan | 370/331 |
| 2002/0045451 | A1 | * | 4/2002 | Hwang et al. | 455/442 |
| 2003/0108027 | A1 | | 6/2003 | Kim | |

(Continued)

FOREIGN PATENT DOCUMENTS

| EP | 1209856 A1 | 5/2002 |
| JP | 2002-028093 | 1/2002 |

(Continued)

OTHER PUBLICATIONS

3GPP TS 25.212 V6.2.0 (Jun. 2004); $3^{rd}$ Generation Partnership Project; Technical Specification Group Radio Access Network; Multiplexing and Channel Coding (FDD) (Release 6).

(Continued)

*Primary Examiner* — Amancio Gonzalez
(74) *Attorney, Agent, or Firm* — Smith, Gambrell & Russell, LLP

(57) ABSTRACT

An mobile station implements data transport which allows for handover. The mobile station transmits a second datum in response to a first datum received from a wireless base station, the mobile station being characterized in that it comprises: a detection unit which detects that handover is to be performed; and a control unit which provides control such that, in cases where the detection has been made, the changeover timing of the transmission destination for the second datum is made later than the changeover timing of the reception channel for the first datum.

14 Claims, 10 Drawing Sheets

(56) References Cited

U.S. PATENT DOCUMENTS

| | | | |
|---|---|---|---|
| 2003/0147370 A1* | 8/2003 | Wu | 370/338 |
| 2003/0185159 A1 | 10/2003 | Seo | |
| 2004/0038680 A1* | 2/2004 | Ishiguro et al. | 455/436 |
| 2004/0165554 A1 | 8/2004 | Chao | |
| 2004/0246917 A1 | 12/2004 | Cheng | |
| 2006/0087980 A1* | 4/2006 | Ikeda et al. | 370/252 |
| 2006/0146751 A1 | 7/2006 | Obuchi | |
| 2007/0147295 A1 | 6/2007 | Ishikawa | |
| 2007/0297370 A1* | 12/2007 | Shimizu et al. | 370/331 |
| 2008/0123601 A1* | 5/2008 | Malladi et al. | 370/335 |

FOREIGN PATENT DOCUMENTS

| | | |
|---|---|---|
| JP | 2003143638 A | 5/2003 |
| JP | 2004140876 A | 5/2004 |
| JP | 2006174273 A | 6/2006 |
| JP | 2012124910 | 6/2012 |
| WO | 0171521 A1 | 9/2001 |
| WO | 2004006515 A1 | 1/2004 |

OTHER PUBLICATIONS

3GPP TS 25.214 (V6.2.0 (Jun. 2004); $3^{rd}$ Generation Partnership Project; Technical Specification Group Radio Access Network; Physical Layer Procedures (FDD) (Release 6).

Notification for Reasons of Refusal dated Oct. 16, 2012 received in Japanese Patent Application No. 2011-234248.

Extended European Search Report dated Nov. 10, 2010 received in corresponding European Patent Application No. 09177076.8-1525/2161870.

"Universal Mobile Telecommunications System (UMTS); UTRA High Speed Downlink Packet Access (HSDPA); Overall description; Stage 2 (3GPP TS 25.308 version 6.2.0 Release 6); ETSI TS 125 308" ETSI Standards, European Telecommunications Standards Institute, Sophia-Antipo, FR, vol. 3-R2, No. V620, Sep. 2004, XP014016787 ISSN: 0000-0001.

Extended European Search Report dated Nov. 10, 2010 received in corresponding European Patent Application No. 10177701.9-1525.

Notification of Reasons for Refusal Japanese Office Action dated Apr. 30, 2013 from corresponding Patent Application No. 2011-234248.

* cited by examiner

WIRELESS BASE STATION AND MOBILE STATION

CROSS REFERENCE TO RELATED APPLICATION

This application is related to and claims priority to Japanese Application No. 2004-366514 filed Dec. 17, 2004 in the Japanese Patent Office, the contents of which are incorporated by reference herein.

BACKGROUND OF THE INVENTION

1. Field of the Invention

The present invention relates to wireless base stations and mobile stations, preferably wireless base stations and mobile station used in a mobile wireless communication system using a W-CDMA (UMTS) communication protocol.

2. Description of the Related Art

Currently, HSDPA (High Speed Downlink Packet Access) is being implemented as one data transport scheme using wireless communication (see Non-Patent Document 1). HSDPA is a scheme which allows high-speed downlink packet transport, with a maximum transfer rate of approximately 14 Mbps being considered possible.

HSDPA is characterized in that it employs an adaptive modulation and coding (AMC) scheme, switching for example between the QPSK modulation scheme and 16-QAM scheme adaptively according to the wireless environment between the base station and mobile station.

Furthermore, HSDPA employs an H-ARQ (Hybrid Automatic Repeat ReQuest) scheme. Under H-ARQ, when a mobile station detects an error in data received from a base station, the mobile station makes a retransmission request to the base station in question. The base station performs retransmission of data upon receiving this retransmission request, and the mobile station performs error correction decoding using both the already received data and the retransmitted received data. In this way, H-ARQ reduces the number of retransmissions by effectively utilizing already received data, even if it contains errors.

The main wireless channels used in HSDPA include HS-SCCH (High Speed-Shared Control Channel), HS-PDSCH (High Speed-Physical Downlink Shared Channel) and HS-DPCCH (High Speed-Dedicated Physical Control Channel).

HS-SCCH and HS-PDSCH are both downlink (i.e. in the direction from the base station to the mobile station) shared channels. HS-SCCH is a control channel for transmitting various parameters relating to the data transmitted on HS-PDSCH. The various parameters include, for example, modulation scheme information indicating which modulation scheme is to be used, the allocated spreading code number (code number), information on the rate matching pattern applied before transmission, etc.

Furthermore, HS-DPCCH is an uplink (in the direction from the mobile station to the base station) dedicated control channel, which is used by the mobile station for instance for sending the result of reception for data received from the base station via HS-PDSCH in the form of an ACK signal or NACK signal (response signal), depending respectively on whether the reception was or was not successful. If the mobile station fails to receive data (if the received data has a CRC error, etc.), a NACK signal will be transmitted from the mobile station as a retransmission request and the base station will accordingly perform retransmission control. Furthermore, if the wireless base station cannot receive either an ACK or a NACK signal (in the case of DTX), the fact that the mobile station has sent neither an ACK nor a NACK signal can also be a retransmission request for purposes of retransmission control.

In addition, HS-DPCCH is used by a mobile station to transmit, to a base station, reception quality information (e.g., SIR), determined by the mobile station for signals received from a base station, in the form of CQI (Channel Quality Indicator) information. The base station then modifies the downlink transmission format based on the received CQI information. In other words, if the CQI information indicates that the downlink wireless environment is good, the base station would switch the transmission format to a modulation scheme that allows higher speed data transmission, while if the CQI information indicates that the downlink wireless environment is not good, the base station would switch the transmission format to a modulation scheme which transmits data at a lower rate (i.e., the base station performs adaptive modulation).

Channel Structure

Next, the channel configuration of HSDPA will be described.

FIG. 1 is a drawing which illustrates the channel configuration of HSDPA. Since W-CDMA employs a code division multiplexing scheme, the individual channels are separated by code.

First, the channels which have not been explained will be briefly described.

CPICH (Common Pilot Channel) is a downlink common channel which is transmitted to all mobile stations in a wireless zone (cell).

CPICH is a channel for transmitting a so-called pilot signal, and is used by the mobile station for channel estimation, cell search, and as timing reference for other downlink physical channels in the same cell.

Next, the timing relationship of the channels will be described using FIG. 1.

As shown in the drawing, in each channel, one frame (10 ms) consists of 3×5=15 slots (each slot comprises a 2560 chip length). As described above, CPICH is used as a reference for other channels, so the head of the P-CCPCH (not shown in diagram) and HS-SCCH frames is aligned with the head of the CPICH frame. Here, the head of the HS-PDSCH frame is delayed by 2 slots relative to HS-SCCH, etc., which is to make it possible for the mobile station to perform demodulation of HS-PDSCH with the modulation scheme corresponding to the received modulation type after receiving modulation type information via HS-SCCH. Furthermore, HS-SCCH and HS-PDSCH comprise sub-frames of 3 slots.

HS-DPCCH is an uplink channel, which contains a slot (1 slot long) used by the mobile station for transmitting an ACK/NACK signal, which is a response for acknowledgement of reception, to the base station approximately 7.5 slots after the HS-PDSCH reception.

Furthermore, HS-PDCCH is used for periodically transmitting CQI information as feedback for adaptive modulation control to the base station. Here, the transmitted CQI information is for example calculated based on the reception environment (e.g. the SIR determination result for CPICH) as determined in the period from 4 slots until 1 slot before the CQI transmission.

Matters relating to HSDPA as discussed above are disclosed for instance in 3G TS 25.212 (3rd Generation Partnership Project: Technical Specification, Group Radio Access Network; Multiplexing and channel coding (FDD)) V6.2.0 (June 2004).

SUMMARY OF THE INVENTION

According to the background art described above, the wireless base station transmits CPICH on a common channel, and the mobile station transmits (part A2) the CPICH reception quality (the CPICH reception SIR) determined in a determination segment (part A1) as a parameter (CQI) for adaptive modulation control. The wireless base station then transmits (part A3) a transmission alert for data to be transmitted based on that parameter, and subsequently transmits (part A4) the adaptively modulated data, and the mobile station transmits (part A5) the reception result (ACK signal or NACK signal) for this data.

This series of procedures starts with transmission of a signal which affects adaptive modulation control, followed by transmission of data using adaptive modulation control and then transmission of a reception result for the transmitted data, thereby ensuring reliable execution of data transmission based on adaptive modulation control.

However, there is the problem that an extremely long time is needed from the transmission of A1 until A3 (A4) or A5 is transmitted (one data transmission cycle).

This problem will be explained here using FIG. 2.

FIG. 2 is a drawing serving to describe the operation during handover, where this problem becomes prominent.

It is assumed that the mobile station moves from wireless zone 1 (cell 1) toward wireless zone 2 (cell 2), and performs processing to effect changeover switch from wireless zone 1 to 2 as it moves.

In the drawing, assuming that handover processing was performed right between subframe 6 and subframe 7, it can be seen that one data transmission cycle will not be completed in the data area framed with a dotted line in the drawing, causing data transmission problems.

The reason for this is that the transmission of the ACK signal indicating the reception result for the third through fifth HS-SCCH sub-frames transmitted in cell 1 (and the corresponding HS-PDSCH sub-frames) is transmitted to cells 2, so reception cannot be acknowledged in cell 1.

Furthermore, HS-SCCH sub-frames 7 through 10 transmitted in cell 2 (and the corresponding HS-PDSCH sub-frames) will be associated with adaptive modulation control based on the CQI for CPICH transmitted in cell 1, rather than adaptive modulation control according to the reception environment.

Moreover, with regard to the sixth HS-SCCH sub-frame (and the corresponding HS-PDSCH sub-frame), the mobile station switches the transmission source cell for reception of HS-PDSCH from 1 to 2 midway in the corresponding HS-PDSCH sub-frame, leading to an error and ultimately rendering useless the transmission alert made by the sixth sub-frame.

Focusing on a single data transmission cycle, if there is problematic data within that cycle, it could cause the same sort of problems with regard to the corresponding HS-SCCH, HS-PDSCH, CQI, and ACK signal as well.

As described above, since a single data transmission cycle is long, it ends up containing problematic data portions over a wide area before and after handover.

Therefore, an objective of the present invention is to implement data transport which allows for handover.

A further objective of the present invention is to maintain the procedure for retransmission control during handover.

Providing beneficial effects, not limited to the above objective, derived from the various components of the best mode for practicing the invention as described below and which cannot be obtained from the prior art, can also be positioned as an objective of the present invention.

(1) The present invention employs a mobile station which transmits a second datum in response to a first datum received from a wireless base station, said mobile station being characterized in that it comprises: a detection unit which detects that handover is to be performed; and a control unit which provides control such that, in cases where said detection has been made, the changeover timing of the transmission destination for said second datum is made later than the changeover timing of the reception channel for said first datum.

(2) Furthermore, the invention employs a mobile station as set forth in claim 1, characterized in that changeover of the transmission destination for said second datum is at least before the timing of transmission of the second datum in response to the first datum first transmitted after changeover of the reception channel for said first datum.

(3) Furthermore, the invention employs a mobile station as set forth in claim 1, characterized in that said first datum is HS-PDSCH and said second datum is an ACK signal or NACK signal.

(4) Furthermore, the invention employs a mobile station as set forth in claim 1, characterized in that changeover of the transmission destination for said second datum is after the successively performed changeover of the CPICH reception channel, changeover of the CQI transmission destination, changeover of the HS-SCCH reception channel, and changeover of the HS-PDSCH reception channel.

(5) Furthermore, the invention employs a mobile station as set forth in (1), characterized in that said control unit provides control, upon changeover of the transmission destination for said second datum due to said handover, such that the frequency or spreading code used for transmission will be different before said handover and after said handover.

(6) Furthermore, the invention employs a mobile station as set forth in (1), characterized in that said control unit provides control, upon changeover of the transmission destination for said second datum due to said handover, such that the frequency or spreading code used for transmission will be the same before said handover and after said handover.

(7) Furthermore, the present invention employs a wireless base station which transmits a first datum and receives a second datum from a mobile station in response to said first datum, said wireless base station being characterized in that it comprises: a detection unit which detects that said mobile station is performing handover; and an acquisition unit which, when said detection has been made, acquires second data which is generated by said mobile station in response to first data transmitted before changeover of the reception channel for said first data and which is transmitted by said mobile station after said changeover.

(8) Furthermore, the invention employs a wireless base station as set forth in (7), characterized in that said acquisition unit either performs acquisition from another wireless base station forming the handover destination wireless zone of said mobile station or performs acquisition itself without going through another wireless base station.

(9) The invention employs a wireless base station as set forth in (7), characterized in that it comprises a forwarding unit which, in cases where said second data acquired by said acquisition unit indicates a reception error, forwards the first data involved in said reception error to the handover destination wireless base station.

The present invention makes it possible to provide a wireless base station and mobile station in consideration of handover process.

Furthermore, the present invention makes it possible to reduce data portions which cause problems during handover.

The present invention furthermore makes it easier to maintain the procedure of retransmission control during handover.

DETAILED DESCRIPTION OF THE PREFERRED EMBODIMENTS

Figure 1:
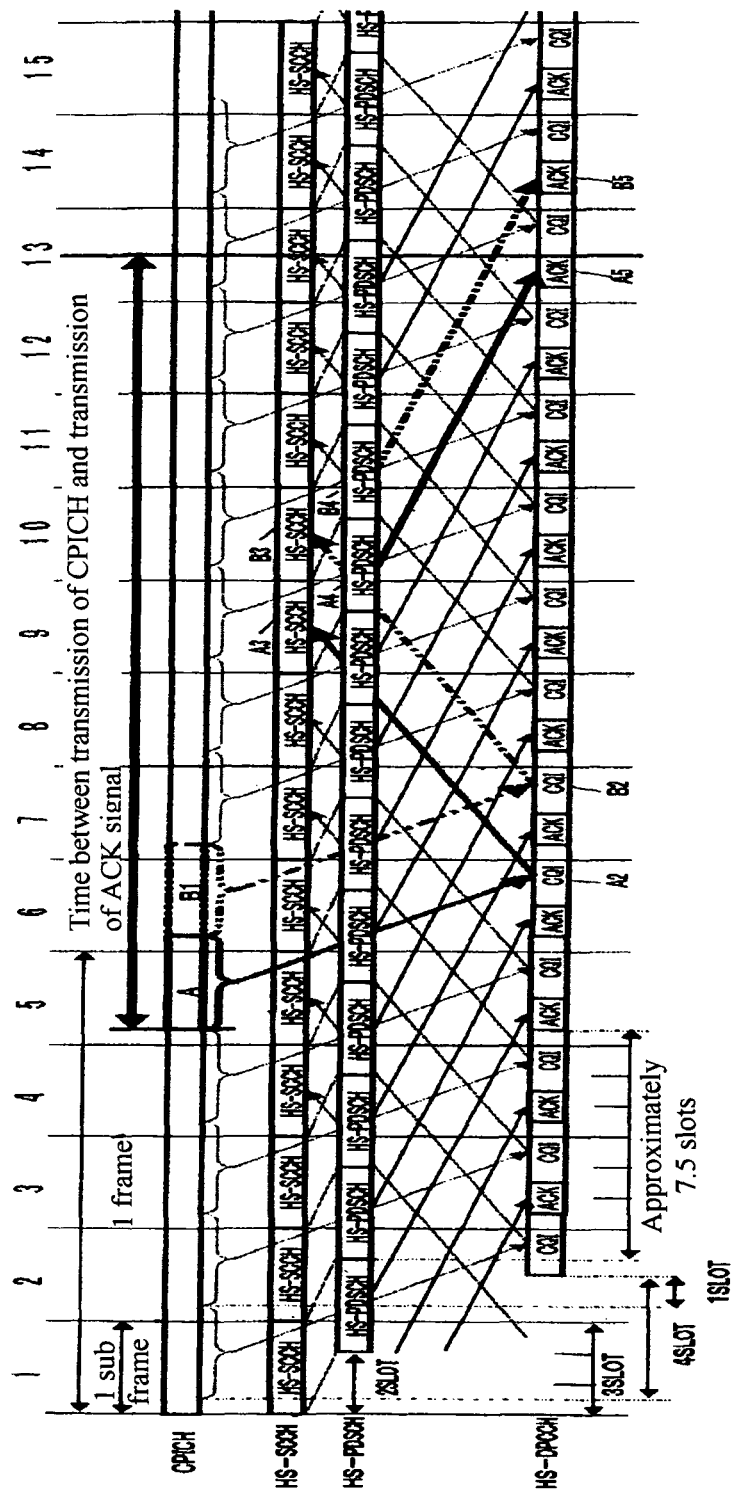
FIG. 1 is a diagram which illustrates the channel configuration of HSDPA.

Below, embodiments of the present invention will be described by referring to the drawings.

(a) Description of First Embodiment

This embodiment involves devising the order in which channels are changed over upon handover.

Namely, in response to the reception of a first datum (e.g. data transmitted via HS-PDSCH, which is the first channel) from a wireless base station, a mobile station transmits a second datum (e.g. a response signal (ACK signal or NACK signal) transmitted via HS-DPCCH, which is the second channel), and if the detection unit of the mobile station detects that handover is to be performed, the control unit of the mobile station provides control such that the changeover timing of the transmission destination for the second datum is made later than the changeover timing of the reception channel for the first datum.

This makes it easier for the second datum to be transmitted to the wireless base station forming the handover source wireless zone (cell).

In particular, when the response signal indicating the reception result for the first datum is transmitted as the second datum and the wireless base station performs retransmission control according to the content of that second datum, the possibility of unnecessary retransmission control occurring is reduced.

Below, this arrangement is described specifically using the previously described HSDPA as an example.

This invention is of course not limited to HSDPA and can be applied to other wireless communication systems which perform handover processing as well. In such cases, as with HSDPA, it is most preferable to apply the invention to systems which perform adaptive modulation control (as well as retransmission control, etc.).

Configuration of Mobile Communication System

Figure 3:
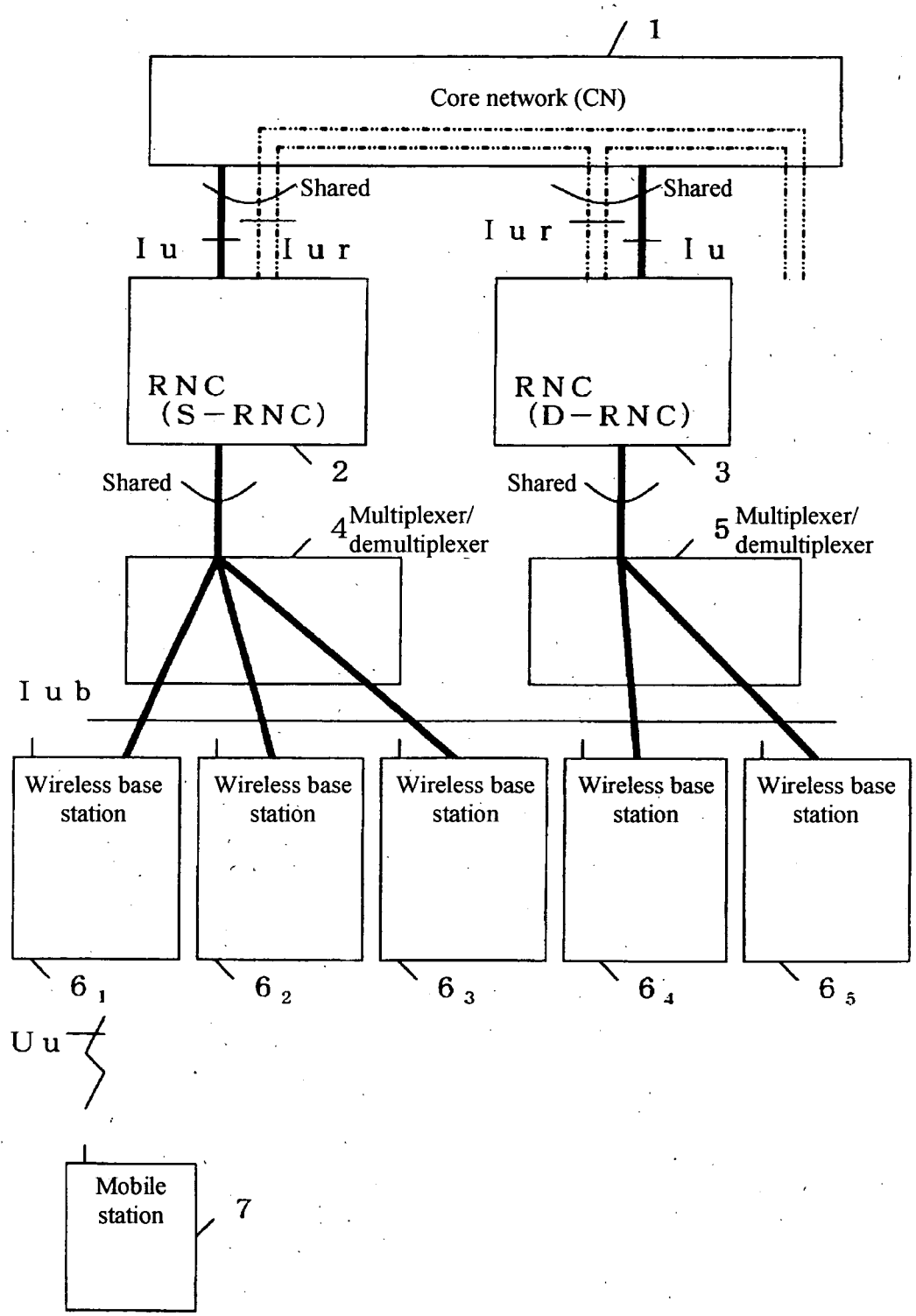
FIG. 3 is a diagram which illustrates a mobile communication system according to the present invention.

FIG. 3 shows an example configuration of a wireless communication system of the present invention. While various types of mobile communication systems are possible, here, the system is assumed to be an HSDPA-compatible mobile communication system based on W-CDMA (UMTS), as described under background art.

In the drawing, 1 is a core network, 2 and 3 are wireless base station controllers (RNC: Radio Network Controller), 4 and 5 are multiplexer/demultiplexers, $6_1$ through $6_5$ are wireless base stations (BS: Base Station) and 7 is a mobile station (UE: User Equipment).

Core network 1 is a network used for routing in the wireless communication system. The core network can comprise for instance an ATM switched network, packet switched network, router network, etc.

Core network 1 is positioned as higher level devices of wireless base stations $6_1$ through $6_5$ and is also connected to other public networks (PSTN), etc., enabling the mobile station 7 to communicate with stationary telephones and the like as well.

The wireless base station controllers 2 and 3, like the constituent devices of the core network, are positioned as higher-level devices of the wireless base stations $6_1$ through $6_5$, and are provided with a function of controlling these wireless base stations $6_1$ through $6_5$ (management of wireless resources used, etc.). They are furthermore provided with the function of performing control relating to handover processing, whereby communication with a mobile station 7 is switched over from communication with a handover source wireless base station to communication with a handover destination wireless base station (the function possessed by the handover processing function unit 13 described below).

Serving RNC and Drift RNC

Here, the concept of serving RNC (S-RNC) and drift RNC (D-RNC) will be explained.

The wireless base station controller which initially manages the processing of outgoing and incoming communications to and from the mobile station 7 is called the serving RNC (RNC 2 in FIG. 1).

If the mobile station 7 subsequently moves toward the right while continuing communication, it will move from the wireless area (cell) formed by wireless base station $6_3$, which is subordinate to serving RNC 2, to the wireless area (cell) formed by wireless base station $6_4$, which is subordinate to RNC 3.

At that time, since there is a need to perform changeover of the wireless base station 6 handling the wireless communication, so-called handover processing (hard handover processing) is executed.

Namely, mobile station 7 switches from transmitting data to wireless base station $6_3$ to transmitting data to wireless base station $6_4$. Furthermore, the reception state wherein data was being received from wireless base station $6_3$ is switched to a reception state wherein data is received from wireless base station $6_4$ (the data reception channel is changed over to the handover destination).

The wireless base station side likewise switches the transmission state wherein data was being transmitted from wireless base station $6_3$ to mobile station 7 to a transmission state wherein data is transmitted from wireless base station $6_4$ to mobile station 7, and switches the channel on which data is received from mobile station 7 from that of wireless base station $6_3$ to that of wireless base station $6_4$.

At the same time, the RNC serving as the gateway for exchanging data involving mobile station 7 with the core network side is assumed to be a single RNC (serving RNC).

Therefore, RNC 3, which manages the handover destination wireless base station $6_4$, forwards signals received from the mobile station 7 to serving RNC 2 (the signals may be forwarded via the core network 1, or if a direct connection is provided between RNCs 2 and 3, the signal may be forwarded via this direct connection, without going through the core network 1).

Prior to the handover, RNC 2, which functions as the serving RNC for mobile station 7, passes on data received from mobile station 7 via a subordinate wireless base station to the core network 1, and after the handover, RNC 2 passes on, to the core network 1, data received from mobile station 7 and forwarded from RNC 3.

RNC 3 is referred to as the drift RNC in relation to the serving RNC.

The same of course holds for signals transmitted downstream (from the core network 1 side to the mobile station 7). First, the signal is transmitted from the core network 1 to the serving RNC 2; before the handover, the serving RNC 2 transmits data to mobile station 7 via a subordinate wireless base station, while after the handover, serving RNC 2 forwards data to the drift RNC 3 and transmits data to the mobile station 7 via a wireless base station 6 subordinate to the drift RNC 3.

RNCs 2 and 3 can be omitted by assigning the functions of these RNCs to the wireless base stations 6 or core network 1. For example, the core network 1 could be provided with a handover processing function and the wireless base stations 6 could be given a wireless channel allocation control function and the like.

While the example described above involved handover between wireless base stations subordinate to different RNCs, handover is executed also between wireless base stations subordinate to the same RNC (e.g., between $6_1$ through $6_3$). In this case, if the RNC is a serving RNC, data from the mobile station 7 received by a subordinate wireless base station can be transmitted to the core network 1 without forwarding to another RNC, and conversely, data received from the core network 1 can be transmitted to the mobile station 7 via a subordinate wireless base station without forwarding to another RNC.

Furthermore, even with a single wireless base station, in cases where a plurality of wireless areas (sectors (cells)) is formed for instance by using a plurality of antennas, handover can be performed between sectors (cells).

Now then, multiplexers/demultiplexers 4 and 5 are provided between the RNC and wireless base stations and perform control to demultiplex signals addressed to each wireless base station received from RNC 2 and 3 and output them to the various wireless base stations, as well as to multiplex signal from the wireless base stations and pass them on to the corresponding RNC.

Of course, these multiplexers/demultiplexers can be omitted if the wireless base station controller is connected directly to a plurality of wireless base stations.

Wireless base stations $6_1$ through $6_3$ perform wireless communication with mobile station 7 with their wireless resources being managed by RNC 2, and wireless base stations $6_4$ and $6_5$ perform wireless communication with mobile stations 7 with their wireless resources being managed by RNC 3.

When the mobile station 7 is within the wireless area (cell) of a wireless base station 6, it establishes a wireless link to the wireless base station 6 and is able to performs communication with other communication devices via the core network 1, and if the mobile station 7 moves, it can continue the communication with the other device by switching the wireless base station being communicated with by means of handover.

The above was an overview of the operation of the mobile communication system of the first embodiment illustrated in FIG. 3. The configuration and operation of each node will be described in detail below.

Wireless Base Station Controller 2 (3)

Figure 4:
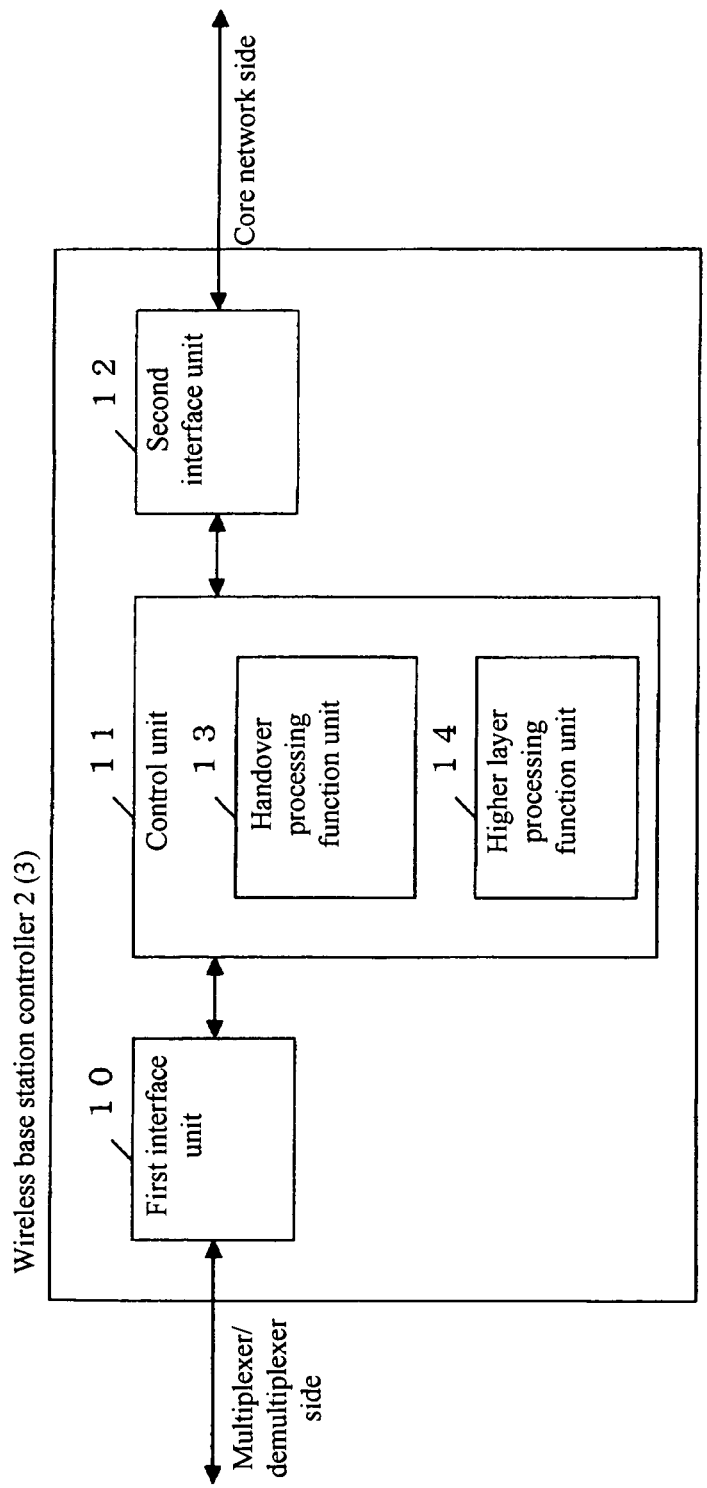
FIG. 4 is a diagram which illustrates a wireless base station controller according to the present invention.

FIG. 4 is a diagram illustrating a wireless base station controller (RNC: Radio Network Controller).

In the diagram, 10 represents a first interface unit for communication with a multiplexer/demultiplexer, 11 represents a control unit which controls the operation of the various units, and 12 represents a second interface unit for communication with the core network.

Preferably, an interface unit which performs transport according to the ATM scheme can be adopted for the first and second interface units. Of course, transmission according to other schemes can be carried out as well.

The control unit 11 controls the operations of the various units and comprises a handover processing function unit 13 which performs the processing relating to the above-described handover (forwarding, wireless channel allocation, etc.), and a higher layer processing finction unit 14 for a layer such as the RLC (Radio Link Control) layer defined in the 3GPP mobile communication system.

Next, the operation involved in transmitting signals from the core network 1 to the multiplexer/demultiplexer 4 (5) will be described.

The controller 11 segments data (e.g. variable length packet data), obtained by performing terminal processing in the second interface unit 12 on the signal received from the core network 1, into specific lengths, and generates, for example, a plurality of RLC PDUs (Packed Data Units).

In order to attach a serial number to each PDU, the control unit 11 writes the serial number into the sequence number field of each segmented RLC PDU. These sequence numbers are used by the mobile station 7 to discover missing PDU sequence numbers, and if a missing sequence number occurs, in order to perform retransmission control in the RLC layer, the PDU sequence number which could not be correctly received is transmitted from the mobile station, and upon receiving this sequence number, the control unit 11 (higher layer processing function unit 14) retransmits the transmitted RLC PDU to the mobile station 7 (a copy of the transmitted RLC PDUs is stored in memory or the like).

Having generated the RLC PDU, the control unit 11 gathers multiple RLC PDUs, generates a signal with a format according to HS-PDSCH FP (frame protocol), and provides it to the first interface unit 10, from where it is subjected to, e.g., ATM cellification, and then transmitted to the multiplexer/demultiplexer 4 (5).

Wireless Base Stations $6_1$ to $6_5$

Figure 5:
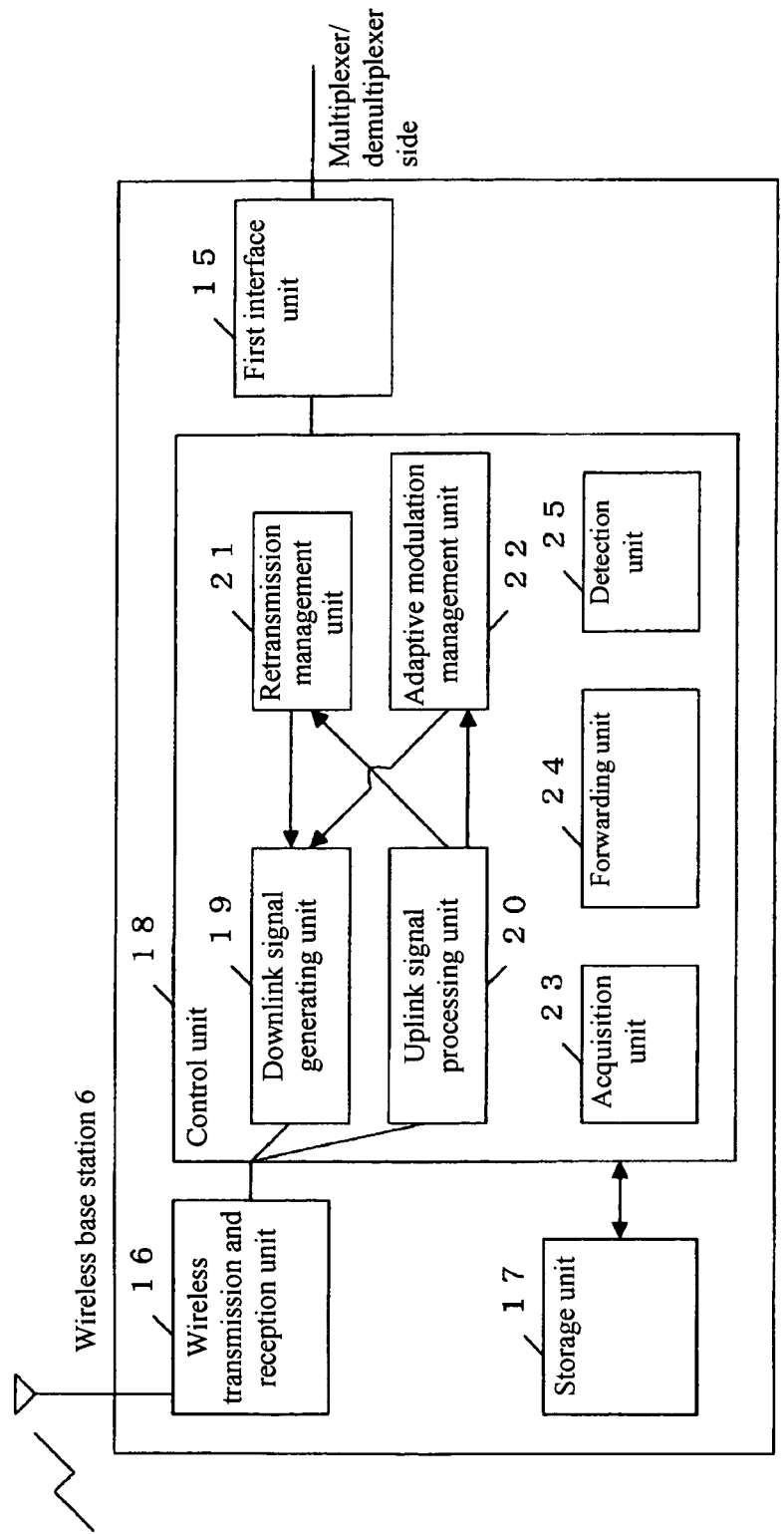
FIG. 5 is a diagram which illustrates a wireless base station (example 1) according to the present invention.

FIG. 5 is a diagram illustrating a wireless base station 6 (BS: Base Station).

In the drawing, 15 represents a first interface unit which performs terminal processing of signals demultiplexed and transmitted from the multiplexer/demultiplexer 4 (5) as signals addressed to the device in question, while 16 represents a wireless transmission and reception unit for transmitting wireless signals to and receiving wireless signals from the mobile station 7.

17 represents a storage unit used for storing transmitted data for retransmission in order to perform the H-ARQ based retransmission control described above, as well as for storing queued data to be transmitted on the HS-PDSCH shared channel.

18 represents a control unit which performs control of the various units and comprises a downlink signal generating unit 19, an uplink signal processing unit 20, a retransmission management unit 21, an adaptive modulation management unit 22, an acquisition unit 23, a forwarding unit 24, and a detection unit 25.

Here, the downlink signal generating unit 19 generates data to be transmitted in the form of downlink signals (the data of CPICH, HS-SCCH, HS-PDSCH, etc.), while the uplink signal processing unit 20 extracts CQI information, ACK signals, NACK signals, and the like from the uplink signal (HS-DPCCH) etc.

Furthermore, the retransmission management unit 21 manages H-ARQ related retransmission control; the acquisition unit 23, as discussed below, acquires CQI information and response signals transmitted by a mobile station 7 forwarded from another wireless base station; and the forwarding unit 24 conversely has the function of forwarding CQI information and response signals received from a mobile station 7 to other wireless base stations.

Furthermore, the detection unit 25 detects that the mobile station 7 is performing handover. The fact that a mobile station is performing handover can be detected for instance by receiving notification from the handover processing function unit 13 of the wireless base station controller 2 (3), based on reception quality information, handover request information or the like transmitted from the mobile station 7. Of course, the detection unit can also detect handover by itself, based on signals received from the mobile station 7.

Next, the operation of processing the data received from the multiplexer/demultiplexer 4 (5) will be described.

First, the HS-PDSCH frames received via the first interface unit 15 are input into the control unit 18.

Control unit 18 stores the MAC-d PDUs addressed to some mobile station, contained in the received HS-PDSCH frame, in the storage unit 17.

Then, upon detecting that transmission of data addressed to that mobile station via the shared channel HS-PDSCH is possible, a plurality of MAC-d PDUs addressed to that mobile station are extracted sequentially from the storage unit 17, an a MAC-hs PDU containing a plurality of MAC-d PDUs is generated. The number of MAC-d PDUs to be extracted is selected so that they fit into the transport block size determined based on CQI information and the like.

A MAC-hs PDU forms one transport block and serves as the source of data transmitted via HS-PDSCH to the mobile station 7.

A MAC-hs PDU contains a TSN (Transmission Sequence Number), which is attached to each MAC-hs PDU, so even if the HS-PDSCH transmission to the mobile station 7 is performed over several processes, the transport block can be rearranged according to this sequence number.

The MAC-hs PDU generated in the control unit 18 is stored in the storage unit 17 for purposes of H-ARQ based retransmission control and is input into the downlink signal generating unit 19, subjected to processing such as error correction coding and error detection coding, formed into an HS-DPSCH sub-frame, and is given to the wireless transmission and reception unit 16 together with other signals, from where it is transmitted to the mobile station 7 via HS-PDSCH.

However, before transmitting HS-PDSCH as described above, a transmission alert is given to the mobile station 7 via HS-SCCH.

In other words, before transmission of HS-PDSCH, control unit 18 provides the data to be transmitted via HS-SCCH to the downlink signal generating unit 19, and the downlink signal generating unit 19 generates an HS-SCCH sub-frame based on the data provided and provides it to the wireless transmission and reception unit 16.

Receiving the transmission alert on HS-SCCH, the mobile station 7 which has received HS-PDSCH transmits the HS-PDSCH reception result (ACK signal or NACK signal) via HS-DPCCH.

The uplink signal processing unit 20 of the wireless base station 6 performs reception processing of the uplink signal (HS-DPCCH, etc.) from the mobile station 7 and notifies the retransmission management unit 21 if the reception result is detected to be a NACK signal.

The retransmission management unit 21 reads the MAC-hs PDU for which transmission failed from the storage unit 17, again provides it to the downlink signal generating unit 19, and causes the wireless transmission and reception unit 16 to perform retransmission.

On the other hand, if the HS-PDSCH reception result is detected by the uplink signal processing unit 20 to be an ACK signal, retransmission control is not necessary, so in order to transmit the next new transport block, the control unit 18 reads unread (not-transmitted) (queued for transmission) MAC-d PDUs stored in the storage unit 17, generates a new MAC-hs PDU, and provides it to the downlink signal generating unit 19 to perform control that causes the wireless transmission and reception unit 16 to transmit.

The foregoing is the H-ARQ (retransmission control) related operation of the wireless base station, but as described above, under HSDPA, CQI information is received periodically by the wireless base station 6 from the mobile station 7 in order perform adaptive modulation control.

CQI information is received by the uplink signal processing unit 20, so the uplink signal processing unit 20 provides this CQI information to the adaptive modulation management unit 22.

CQI information corresponds to the reception quality (e.g. reception SIR) of a downlink signal (e.g. CPICH) transmitted from the wireless base station 6 and received by the mobile station 7.

For example, 30 types of CQI information 1 through 30 are prepared, the mobile station 7 selects and transmits CQI information corresponding to the reception quality, and the adaptive modulation management unit 22 designates the transmission format corresponding to the CQI information received from the mobile station 7 to the wireless transmission and reception unit 16 and downlink signal generating unit 19 to cause adaptive modulation control to be performed according to that format.

Examples of transmission format include the TBS (Transport Block Size) bit number, which indicates the number of bits transmitted in one sub-frame; the code number, which indicates the number of spreading codes used for transmission; and modulation type, which indicates the modulations scheme, such as QPSK or QAM.

Thus, by making the CQI bigger when the SIR of CPICH is better (when the SIR is greater), and defining the corresponding TBS bit number and spreading code number to be greater the greater the CQI, causes the transport speed to be controlled such that it becomes faster when the downlink reception quality is better (conversely, the worse the reception quality, the slower the transport speed is controlled to be).

Since the mobile station 7 also needs to be notified about these transmission formats, the adaptive modulation management unit 22 provides transmission format information to the downlink signal generating unit 19 as data for HS-SCCH which is transmitted as an alert before the transmission of HS-PDSCH, which is transmitted using adaptive modulation control, as described above, and the transmission format information is transmitted to the mobile station 7 via the wireless transmission and reception unit 16.

The foregoing was the basic configuration and operation of the wireless base station 6, but as discussed above, there are also cases where a single wireless base station 6 forms a plurality of wireless areas (cells).

Figure 6:
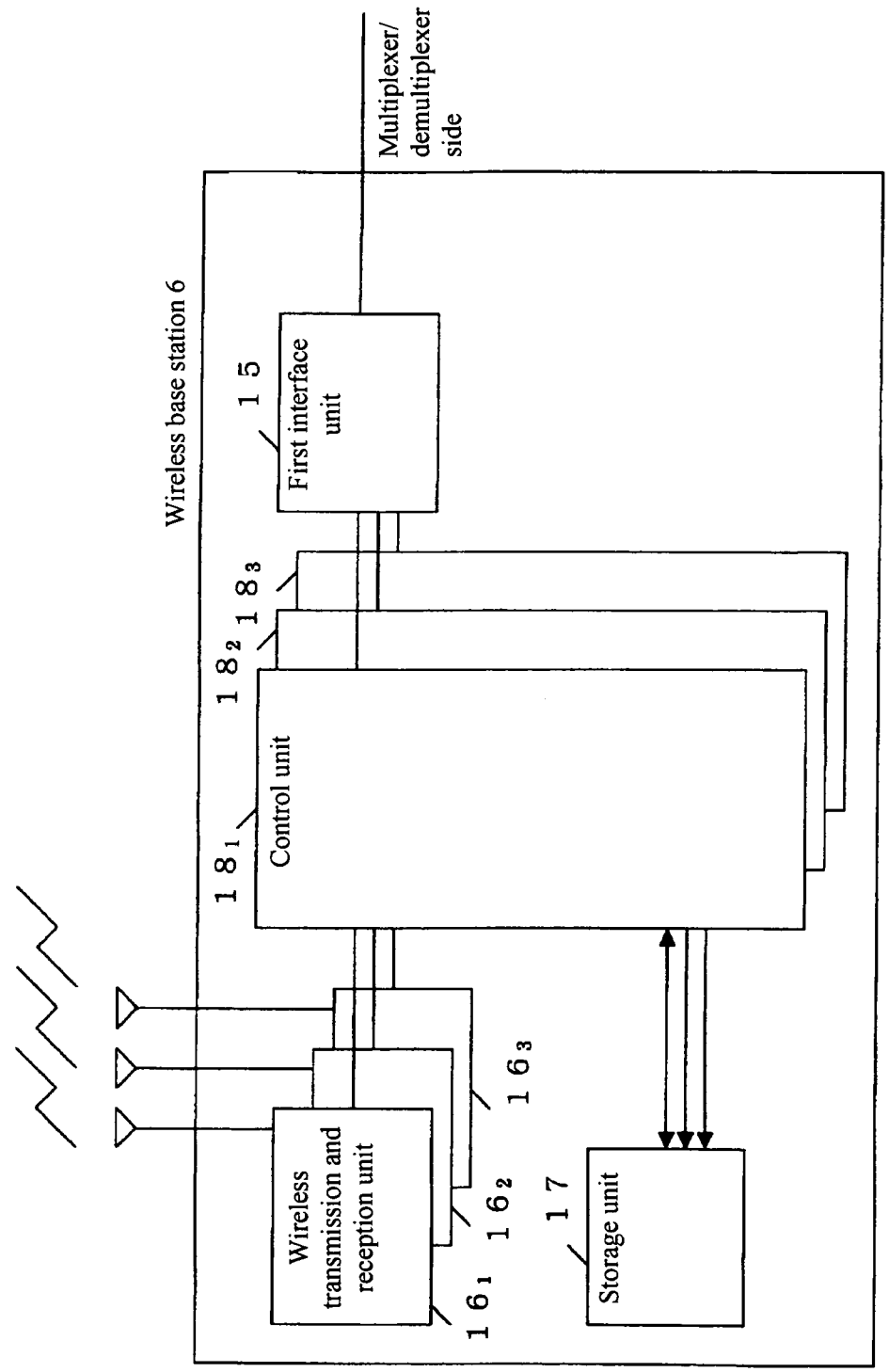
FIG. 6 is a diagram which illustrates a wireless base station (example 2) according to the present invention.

FIG. 6 is a diagram illustrating the configuration in the case where a singe wireless base station forms a plurality of wireless areas.

The various components are basically the same as in FIG. 5, but multiple wireless transmission and reception units 16 and control units 18 are provided, one for each wireless area (cell); and data received via the first interface unit 15 is mapped to the corresponding control units $18_1$ through $18_3$; and each of the control units $18_1$ through $18_3$ executes processing (adaptive modulation control, retransmission control, etc.) equivalent to that of the control unit 18 described above for the wireless area that it serves.

It is also possible to use a shared storage unit 17 for all the control units.

Mobile Station 7

Next, the configuration and operation of the mobile station will be described.

Figure 7:
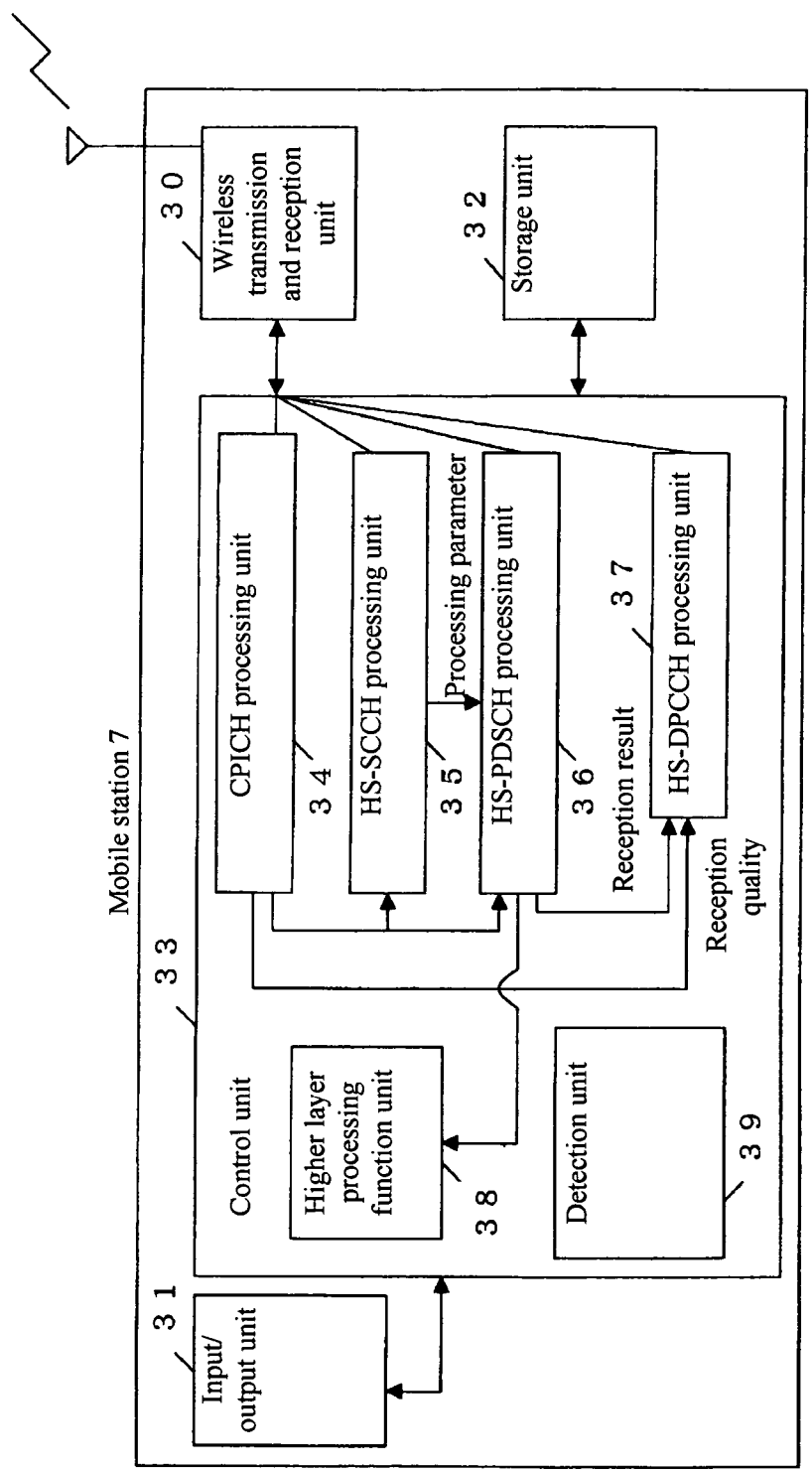
FIG. 7 is a diagram which illustrates a mobile station according to the present invention.

FIG. 7 shows the configuration of mobile station 7. In the figure, 30 represents a wireless transmission and reception unit for performing wireless communication with the wireless transmission and reception unit 16 of the wireless base station 6, and 31 presents an input/output unit which performs input of voice, data, and the like, and output of received voice and data.

32 represents a storage unit which stores various necessary data, and is used for temporarily storing data which caused a reception error in order to implement H-ARQ.

33 represents a control unit which performs control of the various units and comprises a CPICH processing unit 34, HS-SCCH processing unit 35, HS-PDSCH processing unit 36, HS-DPCCH processing unit 37, higher layer processing function unit 38, and detection unit 39.

The CPICH processing unit 34 performs reception processing of CPICH, which is transmitted continually from the wireless base station 6, in determination sectors or the like, and provides the reception quality (reception SIR) determination result to the HS-DPCCH processing unit 37. Furthermore, the IQ plane phase information for the pilot signal obtained by reception processing of CPICH is provided to the HS-SCCH processing unit 35, HS-PDSCH processing unit 36 and the like, enabling synchronization detection (channel compensation).

While receiving HSDPA service, the mobile station 7 periodically transmits CQI information as feedback to the base station via HS-DPCCH for purposes of adaptive modulation control. Here, the CQI information transmitted is for example CQI information corresponding to the result determined in the period from three slots until one slot before CQI transmission.

The correspondences between reception quality (reception SIR) and CQI information are stored in the storage unit 32, making it possible to select the CQI information to be transmitted by selecting the CQI information corresponding to the reception quality.

The HS-SCCH processing unit 35 performs reception processing for each sub-frame of HS-SCCH, which is transmitted from the wireless base station 6, checking if there is a transmission alert that data is to be transmitted to the station in question via HS-PDSCH.

Namely, the HS-SCCH processing unit 35 receives the first part of HS-SCCH, multiplies it by the station-specific code attached to the mobile station and then decodes it, and detects if the transmission was addressed to the station in question based on the decoding result (e.g. likelihood information).

Here, if it is detected that there was a transmission addressed to the station in question, reception processing of the remaining second part is completed, and reception error detection is performed based on the error detection bits for the first and second parts as a whole. If the HS-SCCH processing unit 35 detects an error, the detection of the alert can be considered to have been erroneous, and the following processing in the HS-PDSCH processing unit 36 can be discontinued.

Having detected the presence of a transmission alert addressed to the station in question, the HS-SCCH processing unit 35 notifies the HS-PDSCH processing unit 36 to receive the HS-PDSCH sub-frame two slots ahead.

At the same time, notification of the code information and modulation type information provided in part 1 of HS-SCCH from the wireless base station 6 is also given.

As a result, the HS-PDSCH processing unit 36 can begin reception processing of HS-PDSCH, and thereafter acquires other information required for reception processing which is contained in the remaining second part to complete HS-PDSCH reception processing (de-rate matching, error correction decoding, etc.) from the HS-SCCH processing unit 35 and performs error detection on the decoding result.

The HS-PDSCH processing unit 36 then notifies the HS-DPCCH processing unit 37 regarding the presence or absence of CRC error in the decoding result for HS-PDSCH. It furthermore performs reordering based on the TSN contained in the MAC-hs PDU obtained by decoding, and passes on the data after reordering to the higher layer processing function unit 38.

The higher layer processing function unit 38 determines if there is a missing sequence number in the sequence numbers contained in the MAC-d PDUs, notifies the wireless base station controller 2 (3) via a separately provided dedicated channel regarding the detection of a missing sequence number, and executes retransmission control in the RLC layer.

Received data acquired in the sequence number order is successively output from the input/output unit 31 in the corresponding output format (voice output, image output, etc.).

The HS-DPCCH processing unit 37 selects the parameter (the CQI parameter used for adaptive modulation control in the wireless base station 6) corresponding to the reception quality given by the CPICH processing unit 34 based on the correspondences (CQI table) stored in the storage unit 32, and transmits it to the wireless base station 6 via HS-DPCCH. Furthermore, the HS-DPCCH processing unit 37 transmits the reception result in the form of a response signal (ACK signal or NACK signal) via HS-DPCCH according to the notification of presence or absence of error from the HS-PDSCH processing unit 36.

In other words, the HS-DPCCH processing unit 37 provides and causes the wireless transmission and reception unit 30 to transmit an ACK signal if there is no error or a NACK signal if there is an error.

The detection unit 39 detects that handover is necessary. For example, the mobile station 7 can transmit the determined reception quality information to the wireless base station, and the fact that handover is necessary can be detected by being given a handover instruction from the wireless base station or wireless base station controller.

Based on the above arrangement, each HS-SCCH sub-frame is checked by the mobile station 7, and upon being notified that data will be transmitted to the station in question via HS-PDSCH, the mobile station receives the HS-PDSCH sub-frame two slots ahead, demodulates and decodes (turbo decodes) it to obtain a decoding result, determines if reception was successfully based on CRC computation using the CRC bits, and if reception was not successful, the received data is stored in the storage unit 32, and a NACK signal is transmitted to the wireless base station 6 via HS-DPCCH.

When retransmission is executed by the wireless base station 6, decoding (turbo decoding) is performed after combining the data stored in the storage unit 32 with the retransmitted data, and a CRC check is conducted again on the decoded data.

If the CRC check indicates no error, the HS-DPCCH processing unit 37 performs control to cause an ACK signal to be transmitted to the wireless base station 6 via HS-DPCCH.

Reordering is then performed based on the TSNs contained in the MAC-hs PDU obtained by decoding, and the MAC-d PDUs (RLC PDUs) contained in the reordered transport block are passed on to the higher layer processing function unit 38.

The higher layer processing function unit 38 performs reordering using the sequence numbers contained in the RLC PDUs, and carries out detection of missing sequence numbers and checking of the polling bits.

Here, if a missing sequence number is detected, the RLC processing function unit of the mobile station 17 transmits the sequence number of the PDU that could not be received properly via a separately established dedicated physical channel (DPCH) to the wireless base station controller 2 (3) for retransmission control in the RLC layer.

The ACK signal and the sequence number of the PDU that could not be correctly received are transmitted under control by the higher layer processing unit 38 of the mobile station 7 via the wireless base station 6 and multiplexer/demultiplexer 4 (5) to the wireless base station controller 2 (3).

Upon receiving the sequence number that could not be received correctly from the higher layer processing unit 38 of the mobile station 7, the control unit 11 of the wireless base station controller 2 (3) uses retransmission control processing to read the data (HS-PDSCH frame) to be retransmitted from an unillustrated storage unit and perform retransmission.

The foregoing was a description of the configuration and operation of the various devices. The operation during handover will be described in detail below.

Operation During Handover

Timing of Changeover Relating Transmission Destination for Response Signal (ACK Signal and NACK Signal)

Figure 8:
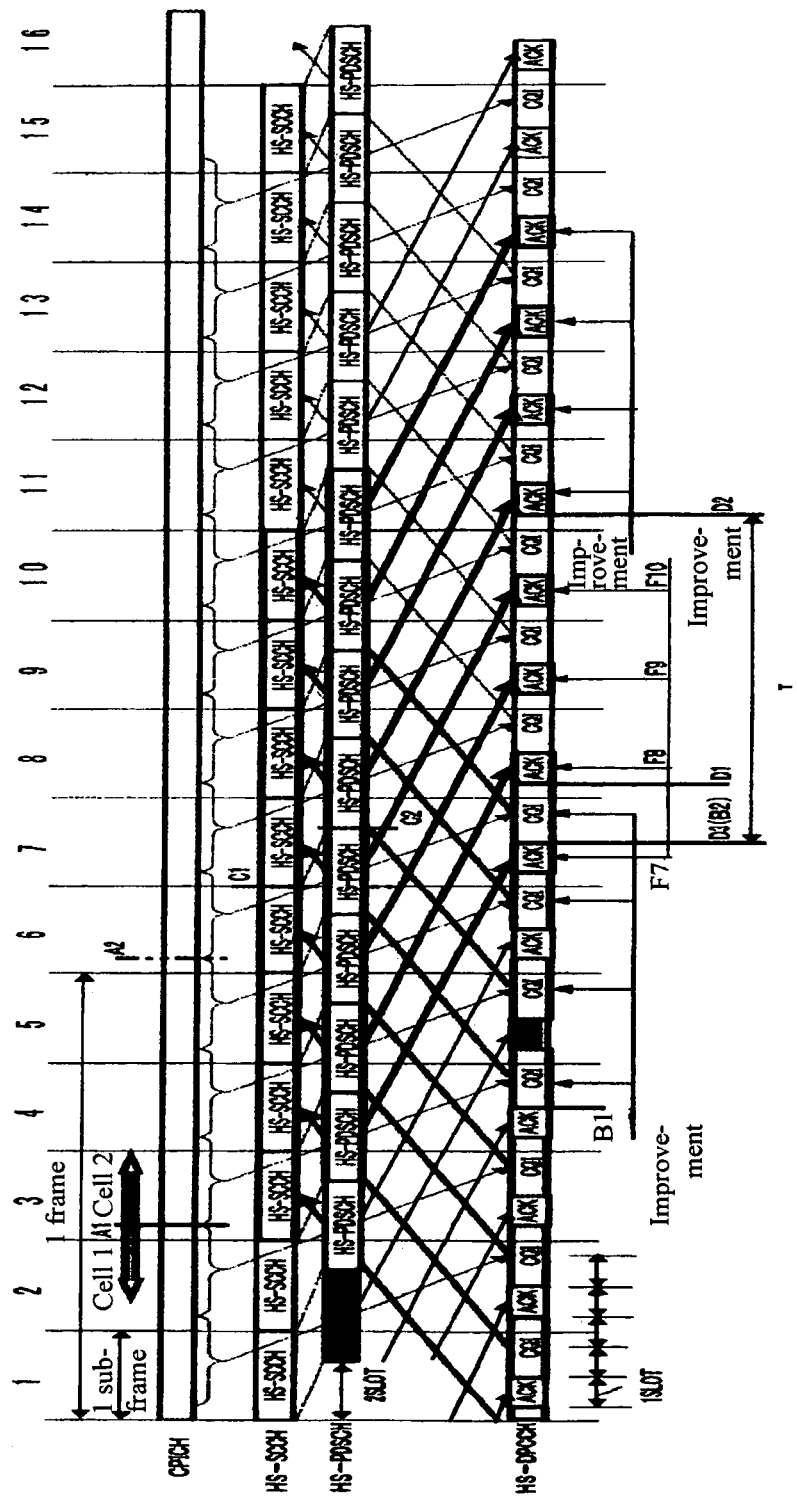
FIG. 8 is a diagram explaining the operation during handover according to the present invention.

FIG. 8 illustrates both the uplink and downlink frame formats to explain the channel changeover procedure during handover.

First, it is assumed that the mobile station 7 is currently located in a wireless zone (cell) of one of the wireless base stations 6 of FIG. 3, and is receiving HSDPA service. Here, it will be assumed that the mobile station 7 is currently located in the wireless zone of wireless base station $6_1$.

In this case, the mobile station 7 receives the first datum (e.g. data received via HS-PDSCH) transmitted from the wireless base station $6_1$ at the HS-PDSCH processing unit 36 (see the solid black portion of HS-PDSCH in FIG. 8), and transmits the response signal thereto (a signal indicating the reception result, such as an ACK or NACK signal) as the second datum by means of the HS-DPCCH processing unit 37 to the wireless base station $6_1$ (see the solid black portion of HS-DPCCH in FIG. 8).

Based on this second datum, the control unit 33 of the wireless base station 61 performs retransmission control to retransmit the data sent via HS-PDSCH or to transmit new data.

Figure 2:
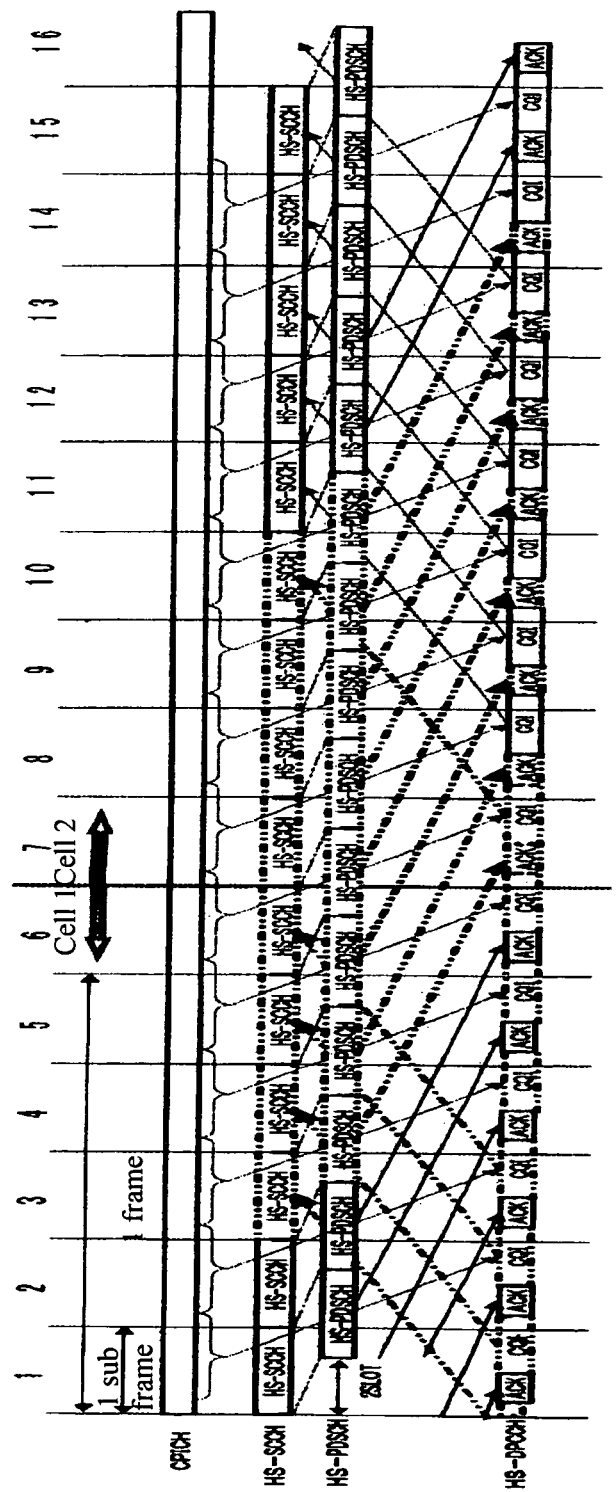
FIG. 2 is a diagram which illustrates the operation during handover.

However, as illustrated in FIG. 2, if a handover occurs midway, a problematic data portion will occur (see the data surrounded by the dotted line frame in FIG. 2).

However, in FIG. 8, the control unit 33 of mobile station 7 performs changeover (from wireless base station $6_1$ to $6_2$) of the channel on which HS-PDSCH is received with the illustrated timing C2 (within the seventh sub-frame), and controls the HS-DPCCH processing unit 34 to at least perform changeover (from wireless base station $6_1$ to $6_2$) of the transmission destination for the response signal or for HS-DPCCH in its entirety, with a timing later than timing C2 (e.g. the timing D1, D2 or a timing between these (preferably at the head of a slot)).

Furthermore, if HS-PDSCH channel changeover is performed at timing C1 (at the head of the seventh sub-frame), at least starting at timing D3, which is after timing C1, response signals (ACK signals and NACK signals) will be transmitted to the wireless zone (cell 2) formed by the handover destination wireless base station $6_2$.

The reason for selecting D3 here is to cause response signals (see F7 in the drawing) transmitted after timing C1, which indicate the reception results for HS-PDSCH already transmitted in the handover source wireless zone before timing C1, to be transmitted to the handover source wireless zone. Of course, at subsequent timing D1 or D2, the transmission destination of the response signals (or the transmission destination of HS-DPCCH in its entirety) can be changed over to the handover destination.

In other words, by changing over the transmission destination after transmission of one of the response signals F7 through F10 has been completed, it is ensured that response signals transmitted before changeover will be transmitted to the handover source wireless zone.

It is most preferable to be able to have the handover source as the transmission destination for all response signals F7 through F10, either by performing the changeover after F10 has been transmitted or by completing changeover by D2 at the latest.

If HS-PDSCH is changed over with timing C1 or C2, the response signal corresponding to HS-PDSCH whereof transmission is first initiated after changeover would be transmitted in the 11th sub-frame in the drawing; performing changeover of the transmission destination for response signals before D2, which is a timing earlier than the timing of said transmission in the 11th sub-frame, is significant.

Namely, since HS-PDSCH is changed over so as to received it from the handover destination wireless base station, response signals are accordingly changed over so that they are transmitted to the handover destination wireless base station, making it possible to maintain the retransmission control cycle.

The detection unit 39 of the mobile station 7 needs to detect D3, D1, D2, etc., which are timings after the changeover timing C1 or C2 of HS-PDSCH, and since timings C1 and C2 can be easily recognized for instance by notification from the handover processing function unit 13 of the wireless base station controller 2, any of the changeover timings 1.5 slots to 12.5 slots later can be detected using C1 as reference, and any of the changeover timings 1.5 slots to 10.5 slots later can be detected using C2 as reference.

Furthermore, with regard to the handover source and handover destination wireless base stations, the notification of timings C1 and C2 from the wireless base station controller 2 or the like makes it possible to use those timings as reference, just as by the mobile station, to specify the reception timing for the response signals and allow proper acquisition of the response signals.

While this embodiment described handover between different wireless base stations, it can also be applied to handover within a single wireless base station having a plurality of sectors, in which case, the processing between different wireless base stations would be replaced with processing between different control units ($18_1$, $18_2$, $18_3$).

Forwarding

Furthermore, in FIG. 8, even if the mobile station 7 changes over the transmission destination for response signals before transmission of any of the response signals indicated by F7 to F10, by accommodating this on the wireless base station 6, smooth retransmission control can be achieved.

Namely, in this case, the response signals (FN (N=7 through 10)) transmitted after changeover of the response signal transmission destination end up being transmitted to the handover destination wireless base station $6_2$ while being generated in response to data received via HS-PDSCH from the handover source wireless base station $6_1$, but the detection unit 25 of the wireless base station $6_2$ detects that mobile station 7 has performed handover, and the forwarding unit 24 is controlled to forward such response signals with a different transmission destination via link Iur to the wireless base station $6_1$ forming the handover source wireless zone.

This allows the handover source wireless base station $6_1$ to acquire response signals forwarded from the handover destination wireless base station $6_2$ by means of acquisition unit 23 and provide them to the retransmission management unit 21, allowing retransmission control to be performed smoothly.

In cases where the response signal transmission destination changeover timing is devised as above, the uplink signal processing unit 20 can acquire response signals directly from the mobile station 7, in which case the uplink signal processing unit would act as the acquisition unit.

The foregoing was a description of the contrivance for changeover timing of the transmission destination for HS-DPCCH (response signals (ACK or NACK signals) indicating the reception result) as the second datum. It is more desirable if improvements are also made to the changeover timing of the CPICH reception channel and the like.

CPICH Reception Channel Changeover Timing

For example, the control unit 33 (handover processing function unit 39) of the mobile station 7 performs changeover (from wireless base station $6_1$ to $6_2$) of the channel on which HS-SCCH is received with timing C1 (at the head of the seventh sub-frame) in FIG. 8, and the CPICH processing unit 34 is controlled to perform changeover (from wireless base station $6_1$ to $6_2$) of the reception channel for CPICH at least before timing C1 (at timing A1, A2 or at the head of a slot between these).

For example, if CPICH reception channel changeover is performed at timing A1 (approximately 0.5 slots into the third sub-frame), CPICH would be received from the wireless zone (cell 2) formed by handover destination wireless base station $6_2$ in the period from 0.5 slots to the 3rd slot of the third sub-frame.

Therefore, CQI information, whereof transmission is initiated one slot after completion of CPICH reception (see timing B1) will correspond to the reception quality of CPICH received from the handover destination wireless base station $6_2$.

Thus, the transmission of this CQI information and its ultimate arrival at wireless base station $6_2$ (adaptive modulation management unit 22) makes it possible for this CQI information to be reflected in the transmission format information used in the transmission alert on HS-SCCH (see seventh sub-frame) transmitted by the wireless base station $6_2$ with timing C1 approximately 5.5 slots after transmission of this CQI information. Of course, HS-PDSCH, which is transmitted after a two slot delay, can likewise be transmitted using this transmission format.

Similarly, for sub-frames 8 through 10, the adaptive modulation management unit 22 of the handover destination wireless base station $6_2$ becomes able to acquire the CQI information selected by the mobile station 7 based on the CPICH transmitted by the wireless base station in question.

Therefore, the fact that the handover processing function unit 39 of the mobile station 7 performs changeover to the handover destination of the channel used for reception quality determination (CPICH) with the timing A1, which is earlier than the timing C1 (C2), reduces problematic data (e.g. data for which adaptive modulation control did not work properly) after changeover to the handover destination of the HS-SCCH (HS-PDSCH) reception channel.

Furthermore, as a result, this also makes the data portion (CQI, ACK signal) indicated as an improvement by the arrows in FIG. 8 problem-free, leading to an improvement of more than one data transport cycle.

Even in cases where the control unit 33 performed changeover of the CPICH reception channel with timing A2, the CQI information transmitted with illustrated timing B2, the corresponding HS-SCCH transmitted in the 10th sub-frame, the HS-PDSCH delayed by two slots, and the ACK signal transmitted with a timing inside the 14th sub-frame are likewise rendered problem-free, so at least one data transport cycle is improved.

While the handover processing function unit 39 of the mobile station 7 needs to detect the timings A1, A2, etc., which are earlier than the timing C1, since the timing C1 can be easily recognized based on notification from the handover processing function unit 13 of the wireless base station controller 2, taking this C1 as reference, it becomes possible to use 11.5 slots earlier (A1), 2.5 slots earlier (A2) or the like as the timing for changeover of the transmission source wireless base station for reception of CPICH. Other timings can also use C1 as reference.

Furthermore, with regard to the handover source and handover destination wireless base stations, the notification of timing C1 by the wireless base station controller 2 or the like makes it possible to use timing C1 as reference, just as by the mobile station, which allows either base station to properly acquire the CQI information by specifying the reception timing for CQI information whereof transmission is initiated earlier than timing C1 from the mobile station.

While this embodiment described handover between different wireless base stations, it can also be applied to handover within a single wireless base station having a plurality of sectors, in which case, the processing between different wireless base stations would be replaced with processing between different control units ($18_1$, $18_2$, $18_3$).

CQI Transmission Destination Changeover Timing

Having performed changeover (to the handover destination) of the CPICH reception channel with timing A1, the handover processing function unit 39 of the mobile station 7 transmits CQI information selected according to the reception quality (reception SIR) of CPICH received from the changeover destination wireless base station $6_2$, the transmission destination for which is preferably changed over with timing B1 (a timing after timing A1 but before timing C1 and C2), which is the transmission timing of the reception quality determined in the determination period initiated from timing A1.

This is to allow the CQI information needed for generation of HS-SCCH, which the mobile station 7 first receives after changeover of the HS-SCCH reception channel to the handover destination (wireless base station $6_2$), to be transmitted directly to the wireless base station $6_2$.

Of course, the transmission destination for CQI information can also be changed over with timing B2 (after timing A1, A2, and C1).

However, in this case, it is preferable for the CQI information transmitted to wireless base station $6_1$ in the period from timing B1 until timing B2 to be forwarded from wireless base station $6_1$ to wireless base station $6_2$ (with the proviso that the CQI information is based on the reception quality of CPICH received from wireless base station $6_2$).

In other words, wireless base station 6, is able to recognize that it is the handover source wireless base station (e.g. by being instructed by the wireless base station controller 2 to hand mobile station 7 over to wireless base station $6_2$ starting with sub-frame 7), and since it has a forwarding unit 24, as illustrated in FIG. 5, it forwards the CQI information received from mobile station 7 to wireless base station $6_2$ by means of the forwarding unit 24.

Therefore, wireless base station $6_2$ is able to acquire, in acquisition unit 23, and provide to the adaptive modulation management unit 22, the CQI information received from wireless base station $6_1$ via wireless base station controller 2, before any CQI information is transmitted to it from mobile station 7.

If the transmission destination for CQI information is changed over with timing B1, the uplink signal processing unit 20 of wireless base station $6_2$ will receive the CQI information directly from mobile station 7, in which case the uplink signal processing unit 20 would be functioning as the acquisition unit.

By devising the changeover timing of each channel as described above, retransmission control, adaptive modulation control and combined control thereof are performed smoothly. Preferably, changeover is performed in the order: timing of changeover (to the handover destination) of the CPICH reception channel, timing of changeover (to the handover destination) of the CQI information transmission destination, timing of changeover (to the handover destination) of the HS-SCCH reception channel, timing of changeover of the transmission destination for response signals.

For example, it is preferable to performing CPICH channel changeover at timing A1, CQI information transmission destination changeover at timing B1, HS-SCCH reception channel changeover at C1, HS-PDSCH reception channel changeover at C2, and response signal transmission timing changeover at D1 or D2.

While the above embodiment presented an example in which HS-SCCH and HS-PDSCH are continually allocated to a single mobile station 7, since they are shared channels, there can also be cases where they are allocated to other mobile stations, and mobile stations to which the data which is the object of improvement in this embodiment is addressed would be able to receive the benefits of this improvement.

Furthermore, in cases where handover is carried out across different RNCs, the processing would be primarily carried out by the serving RNC, as described above, and forwarding of CQI information can be carried out by having the serving RNC, etc. (which may also be called the drift RNC) which received the CQI information from the forwarding unit 24 of the handover destination wireless base station transmit that CQI information to the drift RNC, and having the drift RNC transmit it to the handover destination wireless base station subordinate to the drift RNC.

(b) Description of Second Embodiment

The first embodiment described the operation in a case where there is no misalignment in frame timing between the handover source and handover destination wireless zones (cells), or where it can be ignored.

The situation with a single wireless base station would likely be as in the first embodiment, since aligning the timing of frames between sectors is easy in this case.

However, the present embodiment will deal with the case where a frame timing misalignment exists between the handover source and handover destination wireless zones (cells).

For example, handover between different wireless base stations (especially handover to a different frequency) or handover to a wireless base station subordinate to a different RNC (especially handover of a different frequency) is likely to involve a situation such as in the second embodiment.

Figure 9:
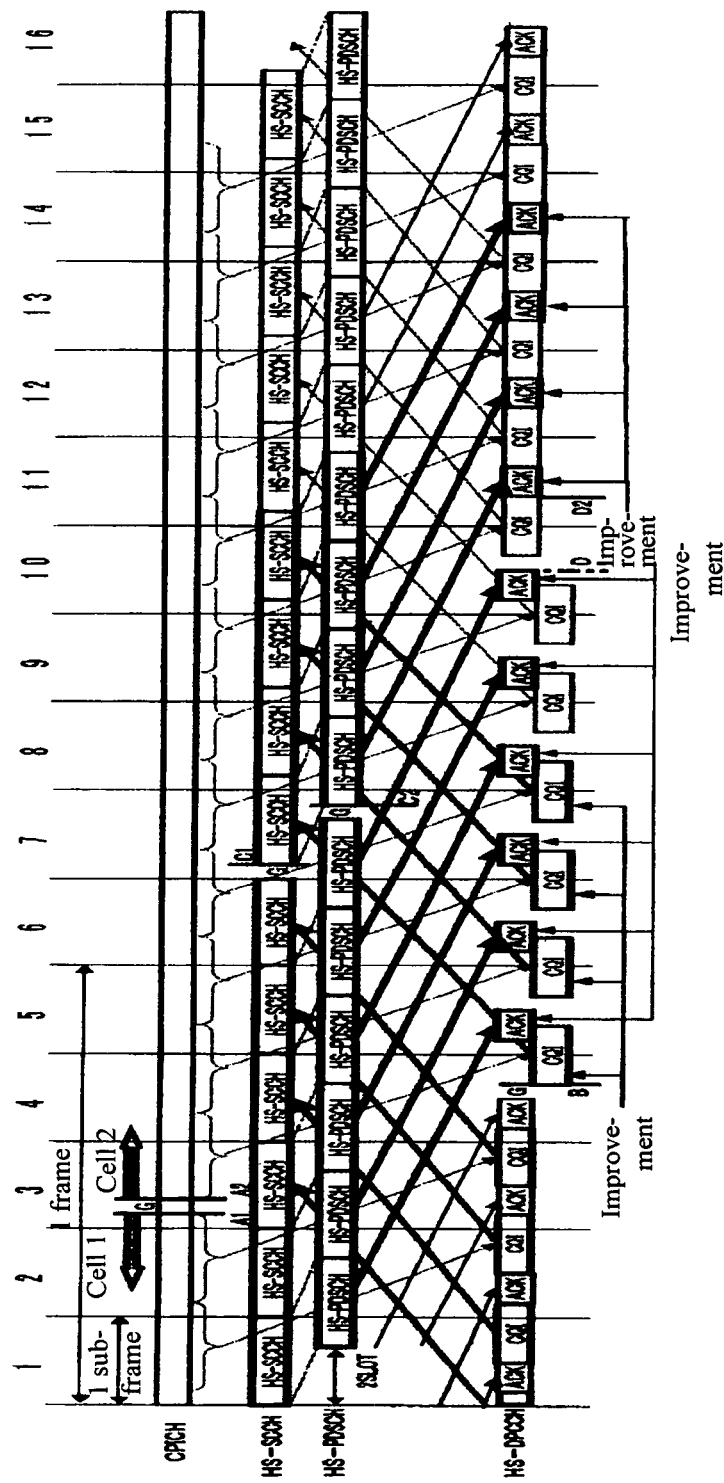
FIG. 9 is a diagram (1) explaining the operation during handover (with frame misalignment) according to the present invention.

FIG. 9 is a diagram which illustrates the frame configuration in a case where a frame timing misalignment (G in the diagram) exists between the handover source and handover destination wireless zones (cells).

If there is a misalignment G in the frame timing before and after handover, processing to compensate for (absorb) this misalignment is necessary.

In this embodiment, we will consider the point that transmission initiation timing C2 of HS-PDSCH which is first received from the handover destination wireless base station 6 by the mobile station 7 after changeover of the HS-PDSCH reception channel is delayed not just by two slots from the head of sub-frame 7 but also by an amount G.

Here, the response signals for HS-PDSCH transmitted from the handover source wireless base station before timing C2 are transmitted in alignment with the frame timing of the handover source wireless base station, and response signals for HS-PDSCH transmitted from the handover source wireless base station after timing C2 are transmitted in alignment with the frame timing of the handover destination wireless base station, so this misalignment is compensated between D1 and D2 in FIG. 9.

In other words, the transmission interval between the timing after completion of transmission of the response signal in the 10th frame and the transmission timing D2 of the response signal in frame 11 is an interval of two slots with the misalignment time G added thereto, and the misalignment is compensated in this interval.

Furthermore, in cases where changeover of the CQI information transmission destination is carried out before the changeover timing C1 of the HS-SCCH reception channel (e.g., at timing B in the drawing), as described above, a time period (B through D1) arises during which the CQI information is transmitted to the handover destination wireless base station and the response signal is transmitted to the handover source wireless base station.

This period includes a portion where the HS-DPCCH signal processing unit 37 of the mobile station 7 transmits the CQI information and response signals overlapping in time. The overlapping transmission can be accomplished for example by transmitting on frequency f1 to the handover source wireless base station and transmitting on frequency f2 (where f1 and f2 are different frequencies) to the handover destination wireless base station.

Overlapping transmission can also be carried out by transmitting the handover source wireless base station using spreading code C1, and transmitting to the handover destination wireless base station using spreading code C2 (where C1 and C2 have different spreading code patterns).

Furthermore, the CPICH changeover timing is favorably made A2 (or in the range A1-A2), which is the initiation timing of the period of CPICH reception quality determination performed to specify the CQI information (in the fourth sub-frame in the drawing) used in HS-SCCH (seventh subframe in the drawing) first transmitted after changeover of the HS-SCCH reception channel, with the misalignment being compensated by means of the period between A1 and A2. The processing needed for reception channel changeover can be carried out in the period between A1 and A2.

(c) Description of Third Embodiment

Figure 10:
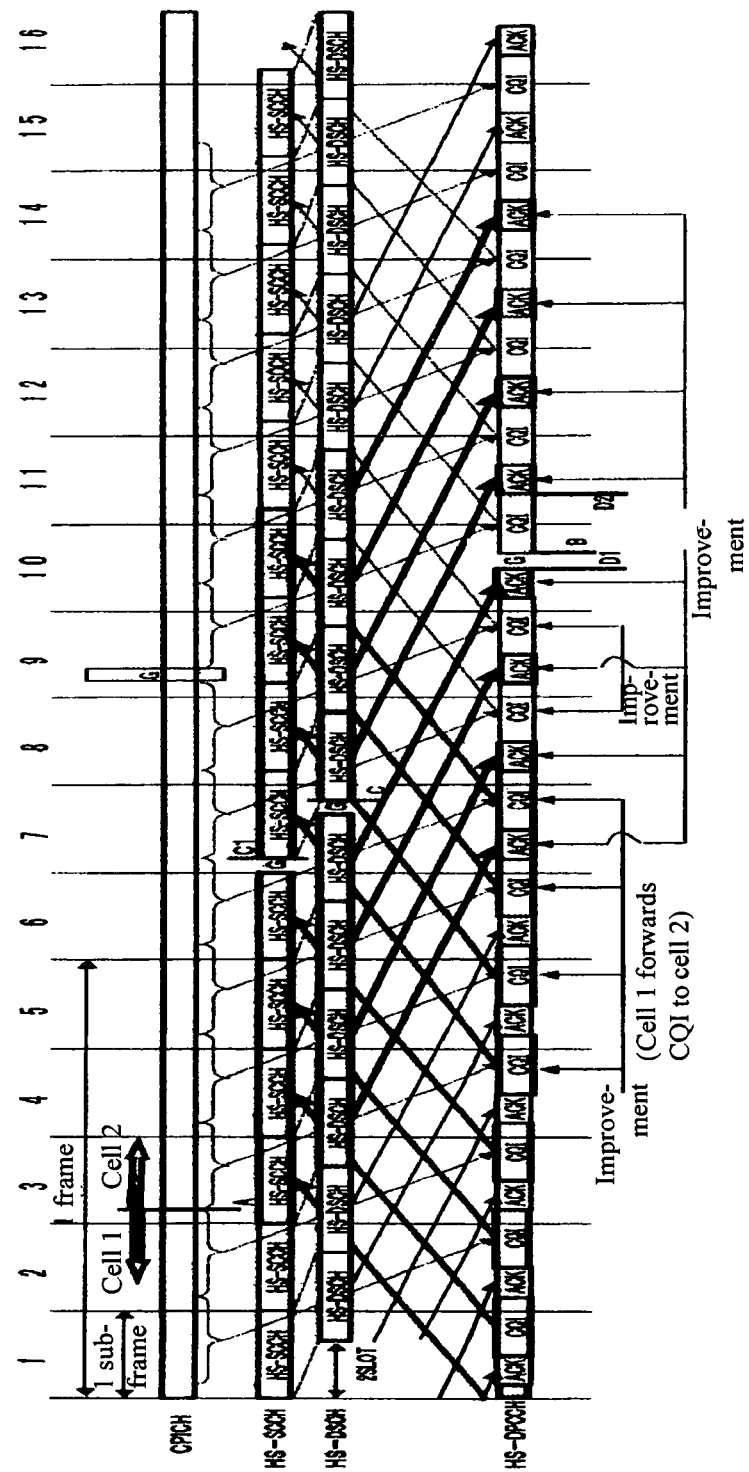
FIG. 10 is a diagram (2) explaining the operation during handover (with frame misalignment) according to the present invention.

FIG. 10 is a diagram which illustrates the frame configuration for a case where a frame timing misalignment (G in the diagram) exists between the handover source and handover destination wireless zones (cells).

In cases where there is a misalignment G in the frame timing before and after handover, processing to compensate (absorb) this misalignment is necessary.

In this embodiment, we will consider the point that transmission initiation timing C2 of HS-PDSCH which is first received from the handover destination wireless base station 6 by the mobile station 7 after changeover of the HS-PDSCH reception channel is delayed not only by two slots from the head of the sub-frame 7 but additionally by an amount G.

Here, HS-DPCCH, which is the channel on which response signals and CQI information are transmitted, is changed over in its entirety in the period between timing Dl, when transmission of response signals for HS-PDSCH transmitted before changeover of the HS-SCCH and HS-PDSCH reception channels carried out at C1 or C2 is completed, and timing D2, when the response signal for HS-PDSCH transmitted after changeover of the HS-PDSCH reception channel is transmitted.

For example, as shown in the drawing, transmission of HS-DPCCH in its entirety (both CQI information and response signals) is carried out in alignment with the transmission frame of the handover source wireless base station until timing D1, and starting at least with timing D2, the entirety of HS-DPCCH (both CQI information and response signals) is transmitted in alignment with the transmission frame of the handover destination wireless base station, thus compensating the misalignment period G by forming the period between timings D1 and B.

In this example, the wireless base station communicated with can be simply changed over while continuing to use the same transmission and reception frequencies, spreading codes, etc. before and after handover, reducing the load on the mobile station.

(d) Description of Fourth Embodiment

In the previous embodiments, response signals for HS-PDSCH transmitted from the handover source wireless base station before changeover of the HS-PDSCH reception channel were transmitted or forwarded to the handover source wireless base station. The present embodiment devises a way of dealing with cases where the last response signal transmitted or forwarded to the handover source wireless base station is a NACK signal (reception error).

Namely, when the last response signal transmitted or forwarded is a NACK signal, the handover source wireless base station 6 reads the data which the NACK signal concerns from the storage unit 17 into the forwarding unit 24 and forwards that data to the handover destination wireless base station.

The handover destination wireless base station then stores the forwarded data in storage unit 17, storing it there as retransmission data to be transmitted to the mobile station 7, and notifies the retransmission management unit 21 that retransmission to the mobile station 7 is needed.

When forwarding is to be performed by the forwarding unit 24, it is preferable to also forward the parameters needed for retransmission control. For example, the fact that this is a retransmission to the mobile station 7 can be indicated by forwarding the Xnd and other information used for retransmission control.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A mobile station which performs wireless communication with a plurality of base stations, the mobile station comprising:
a processing unit configured
to perform reception processing of a modulation scheme from at least one of the plurality of base stations respectively,
to perform reception processing of transmission data by using the modulation scheme from the at least one of the plurality of base stations respectively, and
to perform transmission processing of a reply signal being either of an ACK signal or a NACK signal to the at least one of the plurality of base stations respectively in accordance with whether the transmission data is successfully received or not; and
a control unit configured
to control the processing unit, during a hard handover from a handover source base station of the plurality of base stations to a handover destination base station of the plurality of base stations, so as to complete transmission processing of the reply signal to the handover source base station and further to start transmission processing of the reply signal to the handover destination base station, after starting reception processing of the modulation scheme from the handover destination base station.

2. The mobile station according to claim 1, wherein the control unit performs control for starting reception processing of a second signal from the handover destination base station, after detecting the reception processing of the first signal from the handover destination base station.

3. The mobile station according to claim 2, wherein the control unit performs control for starting transmission processing of a third signal from the handover destination base station, after detecting the reception processing of the second signal from the handover destination base station.

4. The mobile station according to claim 1, wherein the first signal is transmitted via a physical downlink control channel, the second signal is transmitted via a physical downlink shared channel, and the third signal is an acknowledgement signal or a negative acknowledgement signal.

5. The mobile station according to claim 1, wherein the first signal is transmitted via a High Speed-Shared Control Channel, the second signal is transmitted via a High Speed-Physical Downlink Shared Channel, and the third signal is an acknowledgement signal, or a negative acknowledgement signal.

6. The mobile station according to claim 1, wherein the third signal is used for retransmission control between the mobile station and the each of the plurality of base stations respectively.

7. The mobile station according to claim 1, wherein the unit performs transmission processing of a forth signal to the each of the plurality of base stations respectively before the reception processing of the first signal from the each of the plurality of base stations respectively, the forth signal indicating a channel quality and being used for adaptive modulation and coding control between the mobile station and the each of the plurality of base stations respectively.

8. The mobile station according to claim 1, wherein the control unit controls the processing unit so as to receive the second signal from the handover destination base station and transmit the third signal to the handover destination base station, when the first signal is received successfully from the handover destination base station.

9. The mobile station according to claim 1, wherein the control unit controls the processing unit so as not to receive the second signal from the handover destination base station and transmit the third signal to the handover destination base station, when the first signal is not received successfully from the handover destination base station.

10. The mobile station according to claim 1, wherein a first timing when transmission processing of the third signal to the handover source base station is completed is not before a second timing when reception processing of the second signal from the handover source base station is completed.

11. A base station which performs wireless communication with a mobile station, the base station comprising:
a generating unit configured
to perform transmission processing of a modulation scheme to the mobile station, and to perform transmission processing of a transmission data to the mobile station in accordance with the modulation scheme;
a processing unit configured
to perform reception processing of a reply signal being either of an ACK signal or a NACK signal in accordance with whether the transmission data is successfully received or not at the mobile station; and
a control unit configured
to control the processing unit, during a hard handover of the mobile station from a handover source base station of a plurality of base station to the base station, so as to complete transmission processing of the reply signal to the handover source base station of the plurality of base stations and further to start transmission processing of the reply signal to the base station, after starting transmission processing of the modulation scheme to the mobile station.

12. A wireless communication system comprising a mobile station and a plurality of base stations which perform wireless communication with the mobile station, wherein the mobile station comprises:
a processing unit configured
to perform reception processing of a modulation scheme from at least one of the plurality of base stations respectively,
to perform reception processing of transmission data by using the modulation scheme from the at least one of the plurality of base stations respectively, and
to perform transmission processing of a reply signal being either of an ACK signal or a NACK signal to the at least one of the plurality of base stations respectively in accordance with whether the transmission data is successfully received or not; and
a control unit configured
to control the processing unit, during a hard handover from a handover source base station of the plurality of base stations to a handover destination base station of the plurality of base stations, so as to complete transmission processing of the reply signal to the handover source base station and further to start transmission processing of the reply signal to the handover destination base station, after starting reception processing of the modulation scheme from the handover destination base station.

13. A method in a mobile station which performs a wireless communication with a plurality of base stations, the method comprising:
performing reception processing of a modulation scheme from at least one of the plurality of base stations respectively, performing reception processing of transmission data by using the modulation scheme from the at least one of the plurality of base stations respectively, and performing transmission processing of a reply signal being either of an ACK signal or a NACK signal to the at least one of the plurality of base stations respectively in accordance with whether the transmission data is successfully received or not; and
controlling the processing unit, during a hard handover from a handover source base station of the plurality of base stations to a handover destination base station of the plurality of base stations, so as to complete transmission processing of the reply signal to the handover source base station and further to start transmission processing of the reply signal to the handover destination base station, after starting reception processing of the modulation scheme from the handover destination base station.

14. A method in a base station which performs a wireless communication with a mobile station, the method comprising:
performing transmission processing of a modulation scheme to the mobile station;
performing transmission processing of a transmission data to the mobile station in accordance with the modulation scheme;
performing reception processing of a reply signal being either of an ACK signal or a NACK signal in accordance with whether the transmission data is successfully received or not at the mobile station; and
controlling the processing unit, during a hard handover of the mobile station from a handover source base station of a plurality of base station to the base station, so as to complete transmission processing of the reply signal to the handover source base station and further to start transmission processing of the reply signal to the base station, after starting transmission processing of the modulation scheme to the mobile station.

* * * * *